United States Patent Office 3,345,758
Patented Oct. 10, 1967

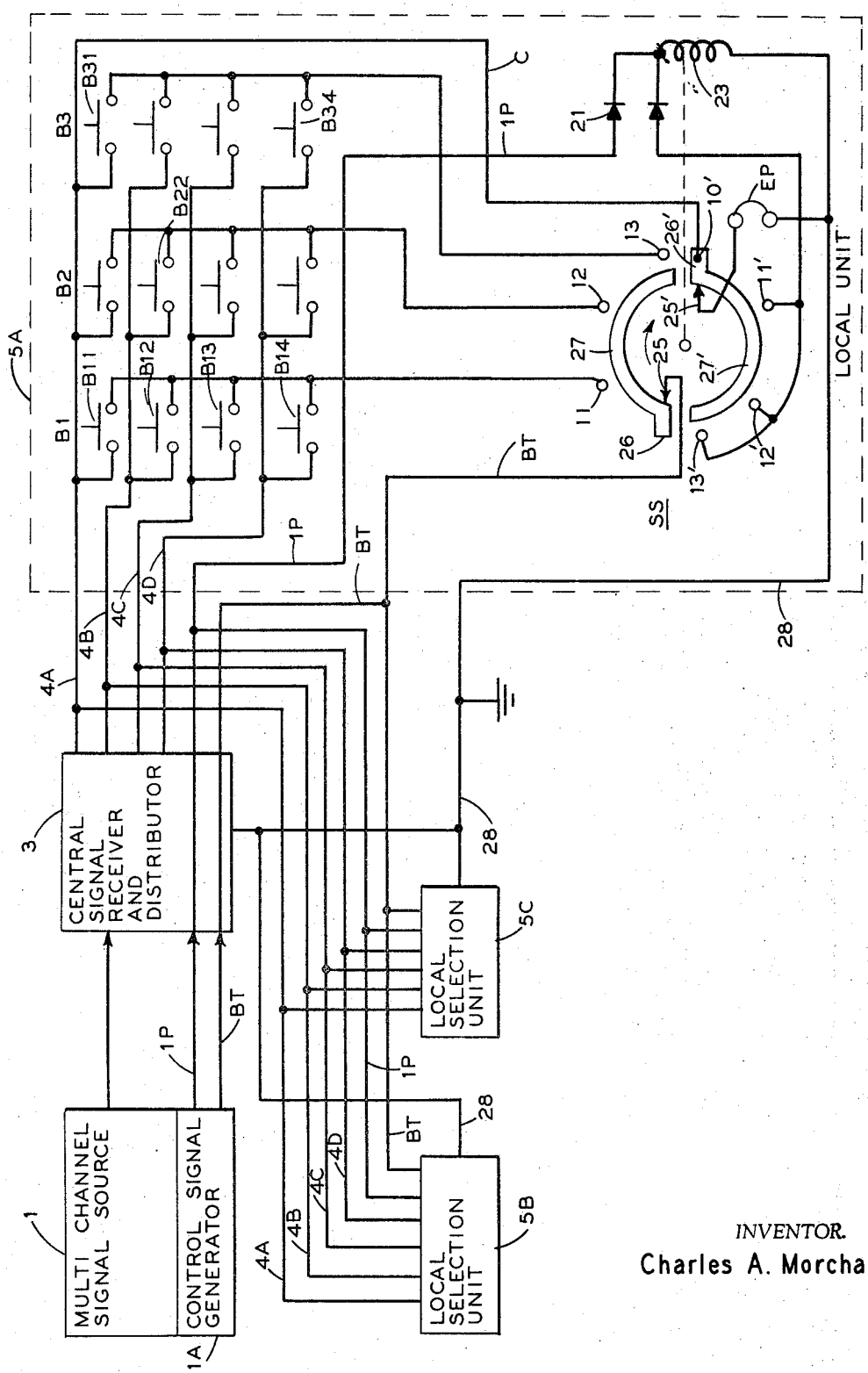

3,345,758
EDUCATIONAL DEVICE
Charles A. Morchand, 288 Lexington Ave.,
New York, N.Y. 10016
Filed Feb. 15, 1966, Ser. No. 527,437
8 Claims. (Cl. 35—9)

ABSTRACT OF THE DISCLOSURE

An apparatus for testing a plurality of students, each having a selection unit, each local selection unit comprising a plurality of banks of selection switches, like ordered ones of switches in the several banks being interconnected to one of a plurality of question-answer signal input lines, stepping switch means having at least one common contact and a plurality of selectable contacts, each in a group of selectable contacts being connected to the several contacts of a selection switch bank associated with such selectable contact, and a program presentation source of question and answer signals for transmitting to the students, presentation means connected to a common contact, the students selecting what each regards to be the correct answer by operating one of the selection switches, and receiving *correct* or *incorrect* answers, depending on each ones selection of the selection switch and hence selection of the particular signal providing input line, and a control signal generator to all selection units providing a control signal to the stepping switch intermediate to the aural question-answer signals.

---

This invention relates to aural information systems, and more particularly to educational or amusement devices by which a number of students or subjects may be tested as to their mastery of a particular field of knowledge. The test may be administered to a number of students simultaneously, and they themselves may verify the correctness of their solutions of the problems posed by the test, the questions and solutions being transmitted to them by the system of the present invention.

Reference is made to my issued United States Patents 3,008,000, 3,180,931, as well as to my co-pending United States application Ser. No. 253,354, filed on Jan. 23, 1963, now patent 3,256,386 the specifications of which describe systems suitable for educational or amusement use. These systems have created a demand for even better systems. It is, accordingly, a general object of the invention to provide a relatively simple, inexpensive and reliable information transfer system suitable to serve for automated educational techniques.

Another object of the invention is provision of a system of the mentioned character, which is relatively simple to manipulate by the student and which by nature of its construction minimizes the possibilities of human error in manipulation.

In accordance with the invention there is provided in an educational device, a local selection unit comprising a plurality of banks of selection switches, like ordered ones of the switches in the several banks being interconnected to one of a plurality of question-answer signal providing input lines, stepping switch means having at least one common contact and a plurality of selectable contacts, each in a group of selectable contacts being connected to the several contacts of a selection switch bank associated with such selectable contact, and presentation means connected to a common contact, whereby questions and answers may be transmitted to a student, the student selecting what he regards to be the correct answer by operating one of said selection switches and receiving when there is a control signal the indication of a correct answer or a correction to an incorrect answer, depending upon his selection of the selection switch and hence selection of the particular signal providing input line.

Other objects, features and advantages of the invention will be evident from the following detailed description, of which the appended claims form a part, when read in connection with the accompanying drawing, in which the single drawing figure is an educational or amusement information transfer system in accordance with a preferred embodiment of the invention.

Referring to the drawing, the illustrated system includes a multi-channel signal source 1, a central receiver and distributor 3, and a number of local selection units 5a, 5b, 5c. A local selection unit is provided for each student who is to undergo testing by questions and answers supplied from the multi-channel signal source 1 via the central signal receiver and distributor 3. The local selection unit 5a is typical for all other local selection units, and only the unit 5a will be described in detail.

The multi-channel signal source 1 contains a suitable program source, which may for example be magnetic tape, tape drive and reproducing heads and audio amplification, if necessary. The magnetic tape may be assumed to contain an audio signal channel or track; the signal reproduced from this track is ultimately distributed onto four signal lines 4a, 4b, 4c and 4d in a manner better understood subsequently. The magnetic tape may further be assumed to contain a synchronizing track providing output signal on a so-called "one-pulse" line 1P and a "burst" line BT. The central signal receiver and distributor 3 serves to commutate the audio information derived from the single track onto the four output lines 4a to 4d in a manner better understood subsequently. The multi-channel signal source 1 (including the control signal generator 1a) and the central signal receiver and distributor 3 consist of conventional devices which are interconnected in conventional manner; hence, they are illustrated in block form for simplicity. The synchronizing lines 1P and BT may be assumed to run through the unit 3 and into the local selection units 5. As an alternative, a multi-audio track magnetic tape may be used from which the lines 4a and 4d would receive the audio signals without necessity for commutation by the central signal receiver and distributor 3.

Each local unit, such as unit 5a, is provided with a plurality of banks of student-operated push-buttons, these banks being designated as B1, B2, B3, etc. The push-buttons in the bank B1 are designated explicitly as B11 to B14, and by implication the buttons of the $n$th bank B$n$1 to B$n$4. The push-buttons are interlocked within a particular bank. Thus, if the push-button B11 is depressed, the last previously depressed push-button in the first bank will be released.

Each local selection unit is also provided with a stepping switch designated generally as SS and a presentation means such as a set of student's earphones EP.

By way of example, the stepping switch SS is assumed to have four positions, namely the illustrated "zero" or "home" position in which a stationary switch wiper 25 is aligned with a tab 26 which is electrically continuous with and projects from an arcuate conductive band 27 which corresponds to somewhat less than 180°. In the "home" position, a second and similar stationary wiper 25' will engage a tab 26' of a second and similar arcuate conducting band 27', as illustrated. The bands or "slip-rings" segments 27 and 27' are electrically insulated from one another.

In the next or "1" position of the stepping switch SS, the tab 26 will engage the contact 11, and the tab 26' the contact 11'. In the position "1," and for that matter also in the positions "2" and "3," the first wiper 25 will engage the second segment 27 while the second wiper 25' will engage the first segment 27. In the position "2," the tab 26 will engage the stationary switch contact 12, and the tabe 26' the stationary contact 12'. In the position "3," the tab 26 will engage the stationary contact 13 and the tab 26' the stationary contact 13'. Following the position "3" the stepping switch SS assumes a position which is another "zero" position. From here on the switching from position to position is cyclical.

The manner of interconnection of the units 1, 3 and 5, as well as the internal connections within unit 5a, will be best understood from a description of the operation of the illustrated apparatus.

Before administration of a testing program begins, the students have been instructed to depress the button B11, or alternatively any one of the buttons B11 to B14, since the first question, as well as subsequent questions (as distinguished from answers thereto) may be transmitted concurrently over each of the four transmission lines 4a to 4d. Each student will have put on each particular earphone head-set EP; the students may be assumed to be in the same classroom, or they may be at locations relatively remote from each other.

The testing program begins with transmission of "one pulse" from a control signal generator 1a contained within the multi-channel signal source 1. The "one pulse" is a single synchronization pulse which is transmitted via line 1P to the local selection unit 5a (as well as to the other local selection units 5 concurrently). The "one pulse" passes through a diode 21, poled as shown through the solenoid 23 of the stepping switch SS to the common ground return line 28.

In consequence, the stepping switch SS advances from the illustrated "zero" to the "1" position. Next, the audio signal lines 4a to 4d transmit the same identical message, so that no matter which button in the bank B1 has been depressed, a path will be completed through that particular button to the contact 11, tab 26, band 27, contact 25' through earphones EP to ground. The message may be a multiple-choice question, phrased typically as follows:

"The President of the United States who served during World War I was—

"If your answer is Theodore Roosevelt, depress the button B21 in bank 2. If your answer is Woodrow Wilson, depress the button B22. If your answer is Franklin D. Roosevelt, depress B23. If your answer is Warren Harding, depress the button B24."

This message is followed by another "1 pulse," which will be effective to place the stepping switch SS into its "2" position. Hereafter, the following messages will be transmitted over answer lines 4a, 4c, 4d, which will give specific corrections and hence respectively via the buttons B21, B23, B24 and ultimately through the earphones EP:

"Your answer is incorrect. The correct answer was Woodrow Wilson."

If the student had depressed the correct answer button B22, he would hear the following message on the earphones EP, transmitted by the line 4b:

"Your answer is correct."
The student will also be given extra information on the subject because he knew the correct answer.

Thereafter, a new question is addressed to each student, much in the same manner as the initial question, except that each student is directed to select his answer by depressing the appropriate answer in the bank B3.

The described pattern is repeated until the end of the program. It should be noted in order to step from the "3" position to the alternate "1" position of the stepping switch SS two pulses will be required so that the "zero" position is stepped over. Following the last question, the stepping switch SS is most likely not to be in the "zero" position, as it should be in preparation for a subsequent testing program. Therefore, following the last audio message, a burst of consecutive pulses is transmitted via the burst line BT. If at this time the stepping switch is not in its "zero" position, a path will be completed via the contact 25 and either the tab 26 or 26' to one of the three interconnected contacts 11', 12' and 13' through a diode 22 and the coil 23 to ground. Each pulse in the burst will be effective to advance the stepping switch SS by one position, until it arrives at a "zero" position, in which the path to the diode 22 is broken. The stepping switch SS comes to rest in the "zero" position. It is noticed that the diodes 21 and 22 constitute an OR circuit. It should be noted that when the stepping switch SS is in the "zero" position a direct connection is made from line 4a, via line C, contact 10' tab 26' (tab 26), band 27' (band 27), and contact 25' (contact 25) to earphones EP. Therefore signals can be fed to the earphone without the student depressing a switch.

The invention has been described with refernce to one embodimet, but various modifications are possible without departing from the essence of the described concept. For example, as has been stated, depending upon the nature of the available program source, the function of the central signal receiver and distributor 3 may be accomplished at once directly from a multi-track magnetic tape or recording device. Also, instead of being directed to multiple-choice questions, the described apparatus can readily be operated for yes-no type questions as well. The number of stepping switch positions and number of push-button banks admits of considerable variation, depending upon best availability of one or the other. For example, one of the positions of the stepping switch could be connected to two banks. As described, the number of positions per band of the stepping switch is one more than the number of push-button banks, but this relation is not absolutely necessary, since equivalent relations can be established by suitable paralleling of push-button banks or of stepping switch contacts. It is also possible to use a single stepping switch to control all selection units.

Further modifications may occur to those skilled in the art, and it is intended to embrace those modifications which do not essentially depart from the disclosed inventive concept as within the invention, for example, while the invention has been described for a purely aural system it can be used in a visual-aural system to control both a sound amplifier-speaker apparatus and the video portions of a television apparatus.

What is claimed is:

1. In an educational device a local unit comprising a plurality of banks of selection switches, like ordered ones of switches in the several banks being interconnected to one of a plurality of question-answer signal providing input lines, stepping switch means having at least one common contact and a plurality of selectable contacts, each in a group of selectable contacts being connected to the several contacts of a selection switch bank associated with such selectable contact, and presentation means connected to a common contact, whereby questions and answers may be transmitted to a student, the student selecting what he regards to be the correct answer by operating one of said selection switches and receiving "correct" or "incorrect" answers, depending upon his selection of the selection switch and hence selection of the particular signal providing input line.

2. A local selection unit according to claim 1, in combination with a program source of question-answer signals providing the question-answer signals to the input lines, and including a control signal generator which provides over a control signal input line stepping-switch-means-advance pulses intermediate question-answer signals.

3. Apparatus according to claim 2, wherein the control signal generator provides over a "burst-of-pulses" input line a succession of pulses which successively advance the stepping switch means to a final "home" position in preparation for subsequent use of the educational device.

4. Apparatus according to claim 2, wherein the program source provides a series of audio signals pertaining to the same problem posed to the student, provided with a central signal receiver and distributor which in time sequence distributes the audio signals of a particular series to the question-answer signal input lines.

5. A plurality of local selection units according to claim 1, each assignable to a separate student, the input lines being common to the several educational devices.

6. A plurality of selection units according to claim 1, in combination with a program source of aural signals providing the question-answer signals to the input lines, and including a control signal generator common to all local selection units which provides over a control signal input line common to all selection units stepping-switch-means-advance pulses intermediate the aural question-answer signals.

7. Apparatus according to claim 6, wherein the control signal generator provides over a "burst-of-pulses" input line common to all local selection units a succession of pulses which successively advance the stepping switch means to a final "home" position in preparation for subsequent use of the educational device.

8. Apparatus according to claim 6, wherein the program source provides a series of audio signals pertaining to the same problem posed to the student, provided with a central signal receiver and distributor common to all selection units which in time sequence distributes the audio signals of a particular series to the question-answer signal input lines.

References Cited

UNITED STATES PATENTS

| | | | |
|---|---|---|---|
| 3,121,959 | 2/1964 | Uttal | 35—9 |
| 3,123,920 | 3/1964 | Crowder et al. | 35—9 |
| 3,180,931 | 4/1965 | Mochand | 178—6.8 |
| 3,256,386 | 6/1966 | Mochand | 178—5.8 |

EUGENE R. CAPOZIO, *Primary Examiner.*

R. W. WEIG, *Assistant Examiner.*